United States Patent
Vakhshoori et al.

(10) Patent No.: US 7,289,208 B2
(45) Date of Patent: Oct. 30, 2007

(54) LOW PROFILE SPECTROMETER AND RAMAN ANALYZER UTILIZING THE SAME

(75) Inventors: Daryoosh Vakhshoori, Cambridge, MA (US); Peili Chen, Andover, MA (US); Peidong Wang, Carlisle, MA (US); Masud Azimi, Belmont, MA (US)

(73) Assignee: Ahura Corporation, Wilmington, MA (US)

( * ) Notice: Subject to any disclaimer, the term of this patent is extended or adjusted under 35 U.S.C. 154(b) by 0 days.

(21) Appl. No.: 11/119,139

(22) Filed: Apr. 30, 2005

(65) Prior Publication Data

US 2006/0044557 A1  Mar. 2, 2006

Related U.S. Application Data

(60) Provisional application No. 60/605,602, filed on Aug. 30, 2004.

(51) Int. Cl.
*G01J 3/28* (2006.01)

(52) U.S. Cl. .................... 356/328; 356/334

(58) Field of Classification Search ............ 356/326, 356/328, 334; 385/37
See application file for complete search history.

(56) References Cited

U.S. PATENT DOCUMENTS

| | | | | |
|---|---|---|---|---|
| 5,026,160 A | * | 6/1991 | Dorain et al. | 356/328 |
| 5,483,337 A | * | 1/1996 | Barnard et al. | 356/328 |
| 5,734,165 A | * | 3/1998 | Unal et al. | 250/338.1 |
| 5,828,450 A | * | 10/1998 | Dou et al. | 356/301 |
| 6,303,934 B1 | * | 10/2001 | Daly et al. | 250/339.02 |
| 6,862,092 B1 | * | 3/2005 | Ibsen et al. | 356/328 |

\* cited by examiner

*Primary Examiner*—Gregory J. Toatley, Jr.
*Assistant Examiner*—Kara E. Geisel
(74) *Attorney, Agent, or Firm*—Pandiscio & Pandiscio

(57) ABSTRACT

A spectrometer comprising a collimating element for receiving input light and collimating the same, a dispersive optical element for receiving light from the collimating element and dispersing the same and a focusing element for receiving light from the dispersive optical element and focusing the same on a detector assembly wherein, where the wavelength dispersion of the dispersed light extends in the x-y direction, the collimating element and the focusing element are formed so as to maintain the desired optical parameters in the x-y plane while having a reduced size in the z direction.

38 Claims, 3 Drawing Sheets

Slab spectrometer using cylindrical mirrors and two high reflectivity top and bottom plats to bound propogation of optical beam in z direction and allow construction of a thin spectrometer.

Conventional spectrometer using bulk or spherical optics.

Slab spectrometer using cylindrical mirrors and two high reflectivity top and bottom plats to bound propogation of optical beam in z direction and allow construction of a thin spectrometer.

LOW PROFILE SPECTROMETER AND RAMAN ANALYZER UTILIZING THE SAME

REFERENCE TO PENDING PRIOR PATENT APPLICATION

This patent application claims benefit of pending prior U.S. Provisional Patent Application Ser. No. 60/605,602, filed Aug. 30, 2004 by Daryoosh Vakhshoori et al. for METHOD OF MAKING LOW PROFILE SPECTROMETER.

The above-identified patent application is hereby incorporated herein by reference.

FIELD OF THE INVENTION

This invention relates to light analyzers in general, and more particularly to spectrometers.

BACKGROUND OF THE INVENTION

Portable applications generally require small and thin components. This is evident from the recent trend in hand-held consumer products such as cellphones and the like. For applications such as portable Raman analyzers (which are designed to identify materials using the optical signatures of those materials), and/or other types of optical readers and spectroscopic applications, compact and low profile spectrometers are of high value.

SUMMARY OF THE INVENTION

Thus, one aspect of the present invention is the provision of a novel spectrometer which is compact and has a low profile.

Another aspect of the present invention is the provision of a novel low profile spectrometer which is compatible with portable and/or hand-held Raman instruments and/or other optical readers and spectroscopic products.

In one form of the invention, there is provided a spectrometer comprising:
 a collimating element for receiving input light and collimating the same;
 a dispersive optical element for receiving light from the collimating element and dispersing the same; and
 a focusing element for receiving light from the dispersive optical element and focusing the same on a detector assembly;
 wherein, where the wavelength dispersion of the dispersed light extends in the x-y direction, the collimating element and the focusing element are formed so as to maintain the desired optical parameters in the x-y plane while having a reduced size in the z direction.

In another form of the invention, there is provided a Raman analyzer comprising:
 a light source for delivering excitation light to a specimen so as to generate the Raman signature for that specimen;
 a spectrometer for receiving the Raman signature of the specimen and determining the wavelength characteristics of that Raman signature; and
 analysis apparatus for receiving the wavelength information from the spectrometer and for identifying the specimen using the wavelength information from the spectrometer;
 wherein the spectrometer comprises:
 a collimating element for receiving input light and collimating the same;
 a dispersive optical element for receiving light from the collimating element and dispersing the same; and
 a focusing element for receiving light from the dispersive optical element and focusing the same on a detector assembly;
 wherein, where the wavelength dispersion of the dispersed light extends in the x-y direction, the collimating element and the focusing element are formed so as to maintain the desired optical parameters in the x-y plane while having a reduced size in the z direction.

In another form of the invention, there is provided a method for analyzing light, comprising:
 receiving input light and collimating the same using a collimating element;
 dispersing the collimated light using a dispersive optical element; and
 receiving the dispersed light from the dispersive optical element and focusing the same on a detector assembly using a focusing element;
 wherein, where the wavelength dispersion of the dispersed light extends in the x-y direction, the collimating element and the focusing element are formed so as to maintain the desired optical parameters in the x-y plane while having a reduced size in the z direction.

In another form of the invention, there is provided a method for identifying a specimen, comprising:
 delivering excitation light to the specimen so as to generate the Raman signature for that specimen;
 receiving the Raman signature of the specimen and determining the wavelength characteristics of that Raman signature using a spectrometer; and
 receiving the wavelength information from the spectrometer and for identifying the specimen using the wavelength information from the spectrometer;
 wherein the spectrometer comprises:
 a collimating element for receiving input light and collimating the same;
 a dispersive optical element for receiving light from the collimating element and dispersing the same; and
 a focusing element for receiving light from the dispersive optical element and focusing the same on a detector assembly;
 wherein, where the wavelength dispersion of the dispersed light extends in the x-y direction, the collimating element and the focusing element are formed so as to maintain the desired optical parameters in the x-y plane while,having a reduced size in the z direction.

In another form of the invention, there is provided a spectrometer comprising:
 a collimating element for receiving input light and collimating the same;
 a dispersive optical element for receiving light from the collimating element and dispersing the same; and
 a focusing element for receiving light from the dispersive optical element and focusing the same on a detector assembly;
 wherein the detector assembly comprises at least one detector hermetically sealed within an enclosure, and further wherein the enclosure is filled with a noble gas.

In another form of the invention, there is provided a method for analyzing light, comprising:
 receiving input light and collimating the same using a collimating element;
 dispersing the collimated light using a dispersive optical element; and receiving the dispersed light from the dispersive optical element and focusing the same on a detector assembly using a focusing element;

wherein the detector assembly comprises at least one detector hermetically sealed within an enclosure, and further wherein the enclosure is filled with a noble gas.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts, and further wherein.

DETAILED DESCRIPTION OF THE PREFERRED EMBODIMENTS

Figure 1:
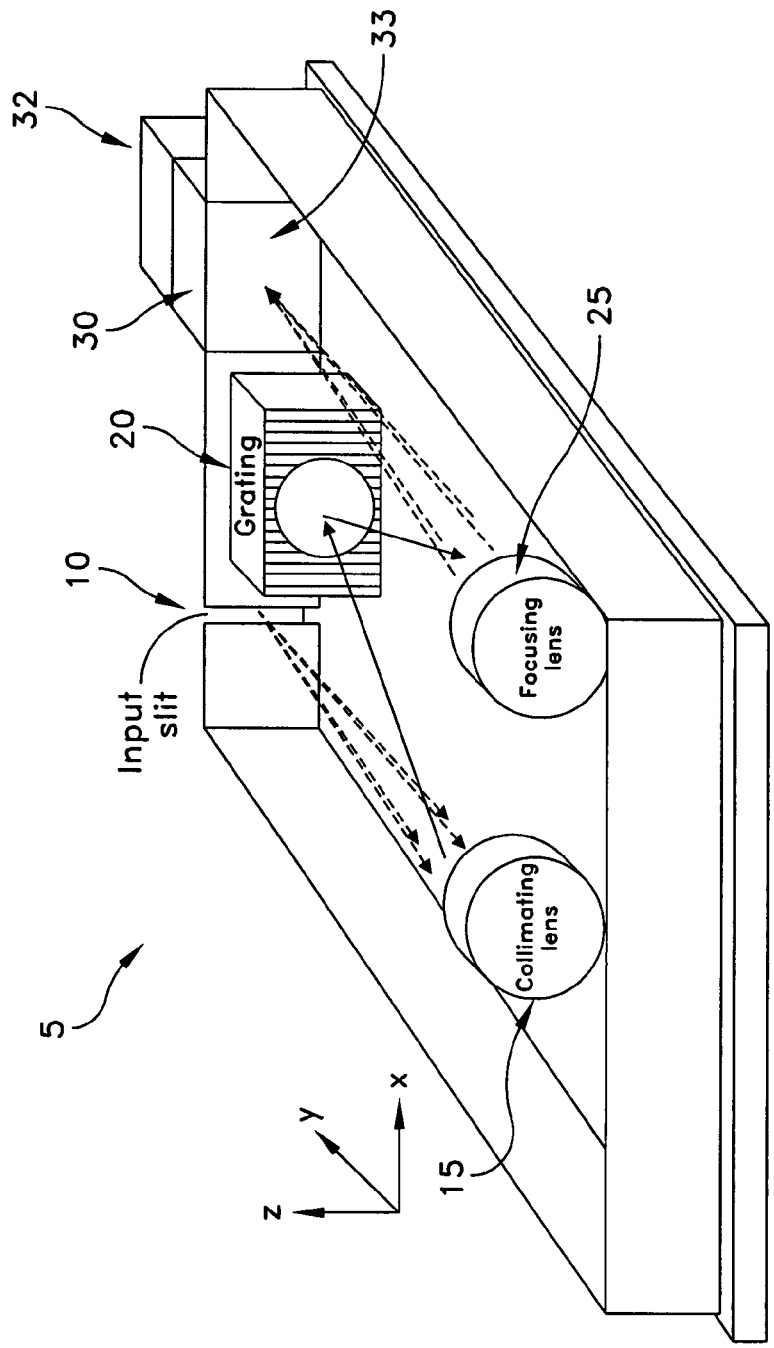
FIG. 1 is a schematic view showing the typical construction of a conventional spectrometer.

The typical construction of a conventional spectrometer is shown in FIG. 1. In this arrangement, light enters the spectrometer 5 through an input slit 10. The slit of light is imaged through a collimating element 15 (e.g., a lens or mirror), a dispersive optical element 20 (e.g., a reflection diffraction grating such as is shown in FIG. 1, a transmission diffraction grating, a thin film dispersive element, etc.) and focusing element 25 (e.g., a lens or mirror) to a detector assembly 30. Detector assembly 30 may comprise a single detector (e.g., a charge coupled device, or "CCD") located beyond an output slit (where dispersive optical element 20 is adapted to rotate), or an array of detectors (where dispersive optical element 20 is stationary), etc., as is well known in the art. A thermoelectric cooler (TEC) 32 may be used to cool detector assembly 30 so as to improve the performance of the detector assembly (e.g., by reducing detector "noise"). A wall 33 may be used to separate detector assembly 30 from the remainder of the spectrometer; in this case, wall 33 is transparent to the extent necessary to pass light to the detector or detectors.

Typically, standard bulk curved elements (i.e., those which are symmetrical about the optical axis) are used to form collimating element 15 and focusing element 25. For the purposes of the present description, these standard bulk curved elements may be considered to be "spherical" in construction, in the sense that they are fully symmetrical about the optical axis. Due to the use of such spherical optics, the thickness of the spectrometer is limited by the diameter of the spherical elements 15 and 25. Unfortunately, however, reducing the diameter of spherical elements 15 and 25 affects the operation of the spectrometer.

However, the resolving power of the spectrometer is largely a function of the optical parameters in the plane of the wavelength dispersion of the dispersed light, i.e., in FIG. 1, the x-y plane of the spectrometer. By way of example but not limitation, if the dispersive element 20 comprises a diffraction grating which has its grooves extending the z direction, the resolving power of the spectrometer is largely a function of the optical parameters in the plane extending perpendicular to the groove lines of the diffraction grating, i.e., the x-y plane. We propose that, so long as the optical parameters are adequately maintained in the plane of the wavelength dispersion of the dispersed light, other optical parameters can be reduced while still meeting acceptable levels of spectrometer performance. Thus, and as will hereinafter be discussed in further detail, the height of a spectrometer can now be reduced while still maintaining acceptable levels of spectrometer performance.

In other words, by way of example but not limitation, for a diffraction grating acting as the dispersive element 20, and looking now at the spectrometer 5 shown in FIG. 1 for illustration, it has now been shown that where the groove lines of diffraction grating 20 extend in the z direction, the resolving power of the spectrometer is largely a function of the optical parameters in the plane extending perpendicular to the groove lines of the diffraction grating 20, i.e., the x-y plane. To a significant extent, the optical parameters in the x-y plane (such as slit size, the focal length of the collimating element 15, the focal length of the focusing element 20, the groove density of diffraction grating 20, the incident angle of the light beam to the diffraction grating 20, etc.) define the resolving power of spectrometer 5. And it has now been shown that, so long as the optical parameters in the x-y plane are adequately maintained, the optical parameters in the x-z plane can be reduced while still maintaining acceptable levels of spectrometer performance. Thus, the height of the spectrometer can be reduced-while still maintaining acceptable levels of spectrometer performance.

Figure 2:
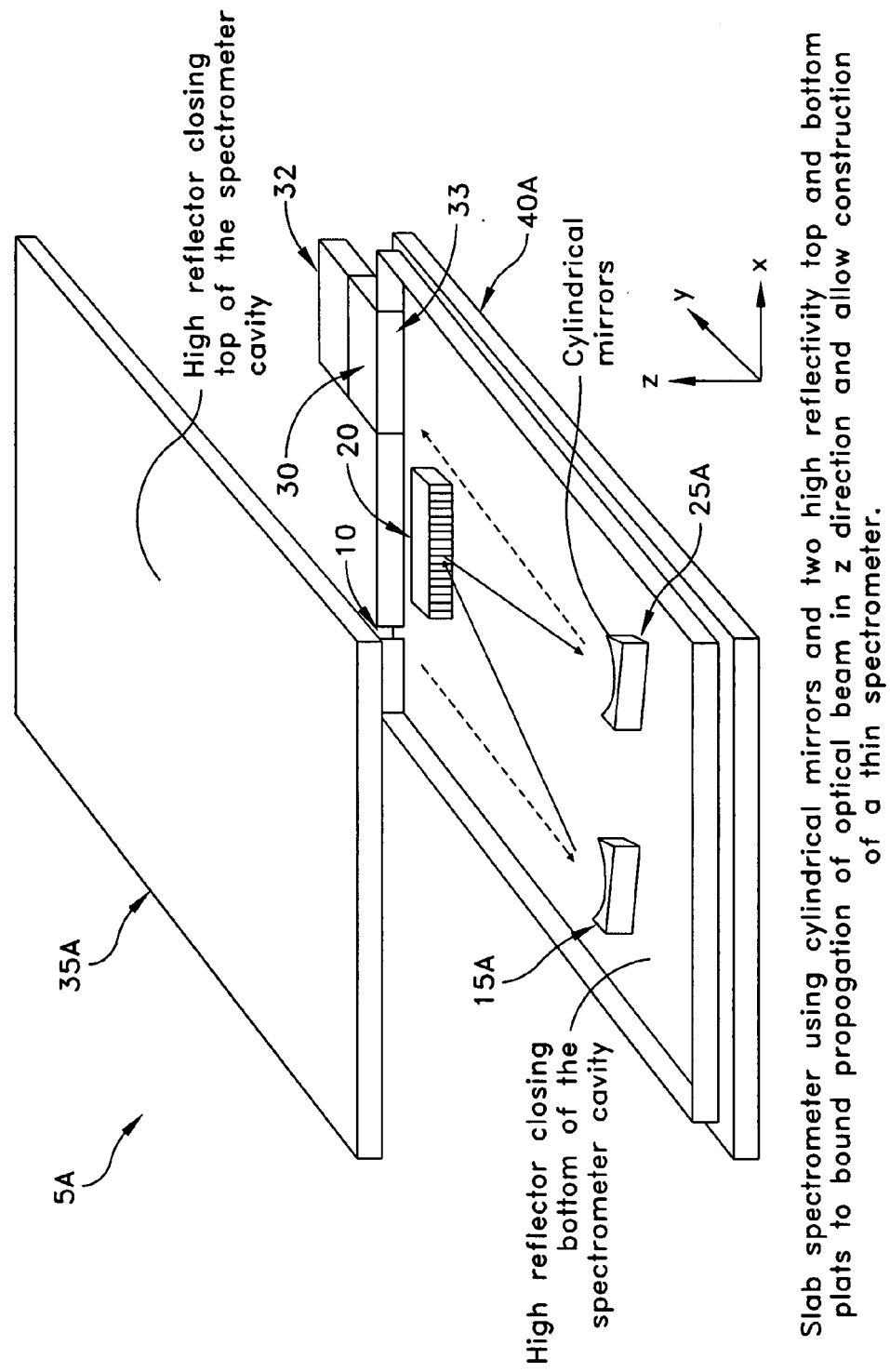
FIG. 2 is a schematic view showing a novel low profile spectrometer formed in accordance with the present invention.

In accordance with the present invention, and looking now at FIG. 2, this reduction in the height of the spectrometer is achieved by utilizing optical elements 15A and 25A which can adequately maintain the desired optical parameters in the x-y plane while having a reduced size in the z direction.

In one form of the invention, the optical elements 15A and 25A can be spherical elements which have been cut (or diced) down in the z direction so as to reduce their dimension in the z direction. In other words, optical elements 15A and 25A can be standard bulk curved elements which are completely symmetrical about their optical axis except that they have been cut down in the z direction so as to provide a lower spectrometer profile. For the purposes of the present description, such optical elements 15A and 25A may be considered to be "diced spherical" in construction. It is believed that diced spherical elements which have an aspect ratio of approximately 3:1 (x:z) or greater provide superior results, achieving a significant reduction in spectrometer profile while still maintaining acceptable levels of performance.

In another form of the invention, the optical elements 15A and 25A can be "cylindrical" in construction, in the sense that they provide a spherical geometry in the x-y plane but a slab geometry in the z plane. In other words, with the cylindrical construction, the optical elements 15A and 25A have a surface profile which is analogous to that of a cylinder. It is believed that cylindrical elements which have an aspect ratio of approximately 3:1 (x:z) or greater provide superior results, achieving a significant reduction in spectrometer profile while still maintaining acceptable levels of performance.

It is to be appreciated that still other optical geometries may be used in optical elements 15 and 25 so as to form a reduced profile spectrometer having acceptable levels of spectrometer performance. In general, these geometries maintain the desired optical parameters in the x-y plane while having a reduced size in the z direction. For example, various non-spherically symmetrical geometries (i.e., those not symmetrical about all axes) may be utilized to form optical elements 15 and 25.

Thus, in FIG. 2 there is shown a novel spectrometer 5A. Light enters the spectrometer 5A through the input slit 10. The slit of light is imaged through the collimating element 15A (e.g., a lens or mirror), the dispersive element 20 (e.g., a reflection diffraction grating such as is shown in FIG. 2, a transmission diffraction grating, a thin film dispersive element, etc.) and focusing element 25A (e.g., a lens or mirror) to a detector assembly 30. Detector assembly 30 may comprise a single detector (e.g., a CCD) located beyond an output slit (where dispersive optical element 20 is adapted to rotate), or an array of detectors (where dispersive optical element 20 is stationary), etc., as is well known in the art. A thermoelectric cooler (TEC) 32 is preferably used to cool detector assembly 30 so as to improve the performance of the detector assembly (e.g., by reducing detector "noise"). A wall 33 is preferably used to separate detector assembly 30 from the remainder of the spectrometer; in this case, wall 33 is transparent to the extent necessary to pass light to the detector or detectors.

In this novel spectrometer, collimating element 15A and focusing element 25A are formed so as to maintain the desired optical parameters in the x-y plane while having a reduced size in the z direction. In one form of the invention, collimating element 15A and focusing element 25A are formed with non-spherically symmetrical geometries. In another form of the invention, collimating element 15A and focusing element 25A are formed with diced spherical geometries. In another form of the invention, collimating element 15A and focusing element 25A are formed with cylindrical constructions. Alternatively, combinations of such constructions may be used.

Still looking now at FIG. 2, novel spectrometer 5A may be open or closed on its top and bottom sides (i.e., as viewed along the z axis). Preferably, however, spectrometer 5A is closed on both its top and bottom sides with plates 35A, 40A so as to seal the spectrometer cavity.

Significantly, in another novel aspect of the invention, plates 35A and 40A may be formed with at least some of their inside faces comprising high reflectivity surfaces, so that the light rays are bounded between high reflectivity mirrors in the z direction, whereby to utilize as much of the light entering input slit 10 as possible.

As noted above, detector assembly 30 may comprise a single detector (e.g., a CCD) located beyond an output slit (where dispersive optical element 20 is adapted to rotate), or an array of detectors (where dispersive optical element 20 is stationary), etc., as is well known in the art. A thermoelectric cooler (TEC) 32 is preferably used to cool detector assembly 30 so as to improve the performance of the detector assembly (e.g., by reducing detector "noise"). A wall 33 is preferably used to separate detector assembly 30 from the remainder of the spectrometer; in this case, wall 33 is transparent to the extent necessary to pass light to the detector or detectors.

Additionally, and in another preferred embodiment of the present invention, the detector assembly 30 is hermetically sealed, and the interior is filled with a noble gas (e.g., helium, neon, argon, krypton, xenon or radon), so as to reduce the power consumption of the TEC 32 used to cool the detector assembly 30.

More particularly, by replacing the air inside the detector assembly 30 with a noble gas, the heat loading of the TEC 32 (due to the convection of air from the side walls of the assembly to the surface of the detector) is reduced, e.g., by a factor of two, which results in a corresponding reduction in the power consumption of the TEC. This is a significant advantage, since the low profile spectrometer 5a may be used in a hand held or portable application requiring a battery power supply.

It should also be appreciated that by hermetically sealing detector assembly 30, condensation can be avoided where the outside temperature becomes higher than the temperature setting of the TEC (and hence the temperature of the detector). Such condensation is undesirable, since it may occur on the detector, which may cause light scattering off the detector, thereby compromising detection accuracy.

Figure 3:
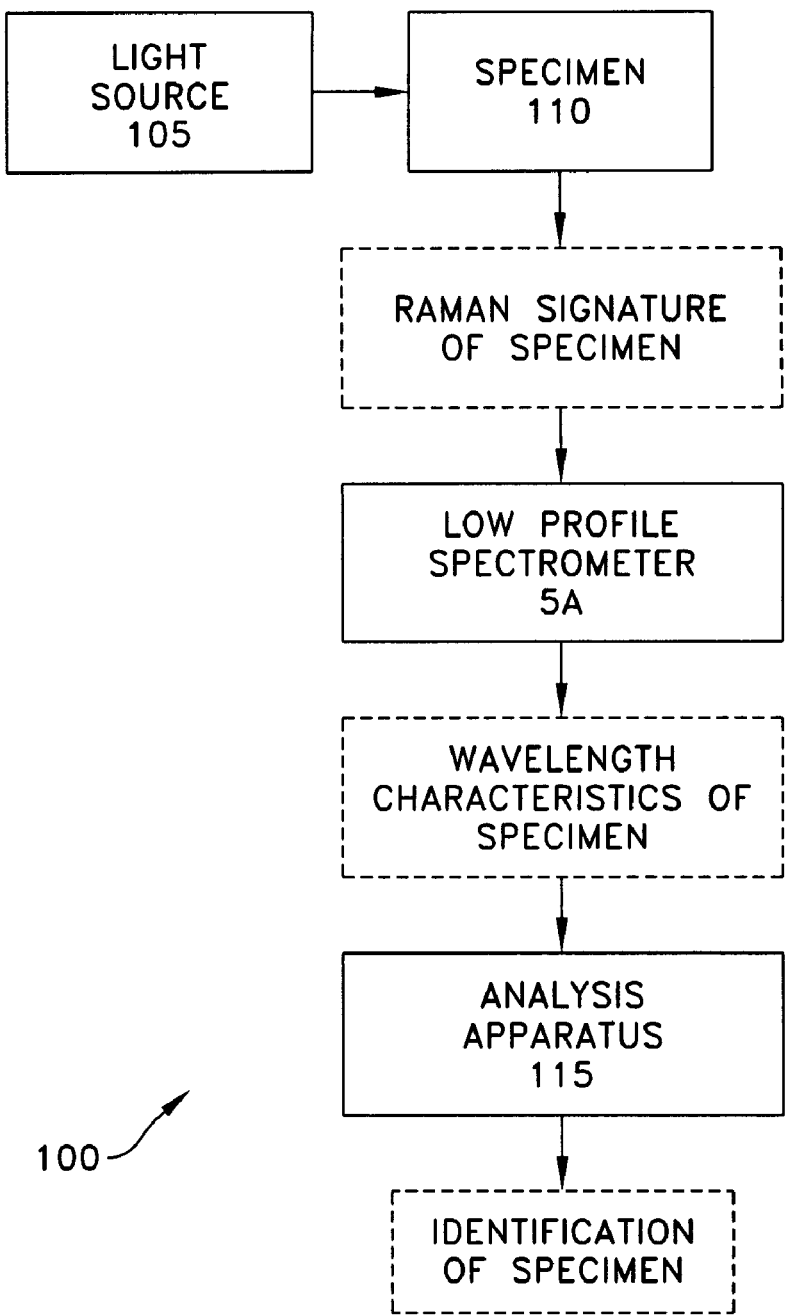
FIG. 3 is a schematic view showing a novel Raman analyzer formed in accordance with the present invention.

It is possible to utilize the novel spectrometer of the present invention in many applications. It is particularly useful in applications requiring small and thin components for portable applications. Thus, for example, in FIG. 3 there is shown (in schematic form) a novel Raman analyzer 100 formed in accordance with the present invention. Raman analyzer 100 generally comprises an appropriate light source 105 (e.g., a laser) for delivering excitation light to a specimen 110 so as to generate the Raman signature for the specimen being analyzed, a low profile spectrometer 5A formed in accordance with the present invention for receiving the Raman signature of the specimen and determining the wavelength characteristics of that Raman signature, and analysis apparatus 115 for receiving the wavelength information from spectrometer 5A and, using the same, identifying specimen 110. By virtue of the fact that Raman analyzer 100 utilizes the low profile spectrometer 5A of the present invention, the entire Raman analyzer can be made smaller and thinner, which is a significant advantage in handheld applications.

In another application, the novel, low profile "slab" spectrometer 5A can be used for transmission or absorption portable spectroscopy instruments.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A spectrometer comprising:
   a base;
   a collimating element for receiving input light and collimating the same;
   a dispersive optical element for receiving light from the collimating element and dispersing the same; and
   a focusing element for receiving light from the dispersive optical element and focusing the same on a detector assembly;
   wherein the collimating element, the dispersive optical element and the focusing element are all formed separately from one another and are all independently mounted to the base so as to be separately adjustable in relation to one another and in relation to the base;
   wherein, where the wavelength dispersion of the dispersed light extends in the x-y direction, the collimating element and the focusing element are formed so to maintain the desired optical parameters in the x-y plane while having a reduced size in the z direction; and
   wherein the collimating element and focusing element are formed with an aspect ratio of approximately 3:1 (x:z) or greater.

2. A spectrometer according to claim 1 wherein the collimating element and the focusing element are formed with non-spherically symmetrical geometries.

3. A spectrometer according to claim 1 wherein the collimating element and the focusing element are formed with diced spherical geometries.

4. A spectrometer according to claim 1 wherein the collimating element and the focusing element are formed with cylindrical constructions.

5. A spectrometer according to claim 1 wherein the collimating element is formed using a construction selected from the group consisting of non-spherically symmetrical geometries, diced spherical geometries and cylindrical constructions, and further wherein the focusing element is formed using a construction selected from the group consisting of non-spherically symmetrical geometries, diced spherical geometries and cylindrical constructions.

6. A spectrometer according to claim 1 wherein the collimating element comprises a lens.

7. A spectrometer according to claim 1 wherein the collimating element comprises a mirror.

8. A spectrometer according to claim 1 wherein the dispersive optical element is a diffraction grating.

9. A spectrometer according to claim 8 wherein, where the groove lines of the diffraction grating extend in the z direction, the collimating element and the focusing element are formed so as to maintain the desired optical parameters in the x-y plane while having a reduced size in the z direction.

10. A spectrometer according to claim 8 wherein the dispersive optical element comprises a reflection diffraction grating.

11. A spectrometer according to claim 8 wherein the dispersive optical element comprises a transmission diffraction grating.

12. A spectrometer according to claim 1 wherein the dispersive optical element comprises a thin film element.

13. A spectrometer according to claim 1 wherein a focusing element comprises a lens.

14. A spectrometer according to claim 1 wherein a focusing element comprises a mirror.

15. A spectrometer according to claim 1 wherein the detector assembly comprises at least one detector.

16. A spectrometer according to claim 1 wherein the detector assembly comprises a single detector located beyond an output slit, and further wherein the dispersive optical element is adapted to rotate.

17. A spectrometer according to claim 1 wherein the detector assembly comprises an array of detectors, and further wherein the dispersive optical element is stationary.

18. A spectrometer according to claim 1 wherein the detector assembly comprises at least one charge coupled device.

19. A spectrometer according to claim 15 wherein the at least one detector is hermetically sealed within an enclosure.

20. A spectrometer according to claim 19 wherein the enclosure is filled with a noble gas.

21. A spectrometer according to claim 19 wherein the enclosure is filled with a gas selected from the group consisting of helium, neon, argon, krypton, xenon and radon.

22. A spectrometer according to claim 1 wherein the spectrometer is closed off on both its top and bottom sides with plates so as to seal the spectrometer cavity.

23. A spectrometer according to claim 22 wherein the plates are formed with at least some of their inside faces comprising high reflectivity surfaces, so that the light rays are bounded between high reflectivity mirrors in the z direction.

24. A Raman analyzer comprising:
    a light source for delivering excitation light to a specimen so as to generate the Raman signature for that specimen;
    a spectrometer for receiving the Raman signature of the specimen and determining the wavelength characteristics of that Raman signature; and
    analysis apparatus for receiving the wavelength information from the spectrometer and for identifying the specimen using the wavelength information from the spectrometer;
    wherein the spectrometer comprises:
        a base;
        a collimating element for receiving input light and collimating the same;
        a dispersive optical element for receiving light from the collimating element and dispersing the same; and
        a focusing element for receiving light from the dispersive optical element and focusing the same on a detector assembly;
        wherein the collimating element, the dispersive optical element and the focusing element are all formed separately from one another and are all independently mounted to the base so as to be separately adjustable in relation to one another and in relation to the base;
        wherein, where the wavelength dispersion of the dispersed light extends in the x-y direction, the collimating element and the focusing element are formed so as to maintain the desired optical parameters in the x-y plane while having a reduced size in the z direction; and
    wherein the collimating element and the focusing element are formed with an aspect ratio of approximately 3:1 (x:z) or greater.

25. A Raman analyzer according to claim 24 wherein the light source comprises a laser.

26. A Raman analyzer according to claim 24 wherein the collimating element and the focusing element are formed with non-spherically symmetrical geometries.

27. A Raman analyzer according to claim 24 wherein the collimating element and the focusing element are formed with diced spherical geometries.

28. A Raman analyzer according to claim 24 wherein the collimating element and the focusing element are formed with cylindrical constructions.

29. A Raman analyzer according to claim 24 wherein the collimating element is formed using a construction selected from the group consisting of non-spherically symmetrical geometries, diced spherical geometries and cylindrical constructions, and further wherein the focusing element is formed using a construction selected from the group consisting of non-spherically symmetrical geometries, diced spherical geometries and cylindrical constructions.

30. A Raman analyzer according to claim 24 wherein the spectrometer is closed off on both its top and bottom sides with plates so as to seal the spectrometer cavity.

31. A Raman analyzer according to claim 30 wherein the plates are formed with at least some of their inside faces comprising high reflectivity surfaces, so that the light rays are bounded between high reflectivity mirrors in the z direction.

32. A spectrometer comprising:
a base;
a collimating element for receiving input light and collimating the same;
a dispersive optical element for receiving light from the collimating element and dispersing the same;
a focusing element for receiving light from the dispersive optical element and focusing the same on a detector assembly;
a first chamber for housing the collimating element, the dispersive optical element and the focusing element, wherein the first chamber is filled with ambient air; and
a second chamber for housing the detector assembly;
wherein the detector assembly comprises at least one detector hermetically sealed within the second chamber, and further wherein the second chamber is filled with a noble gas.

33. A spectrometer according to claim 32 wherein, where the wavelength dispersion of the dispersed light extends in the x-y direction, the collimating element and the focusing element are formed so as to maintain the desired optical parameters in the x-y plane while having a reduced size in the z direction.

34. A method for analyzing light, comprising:
receiving input light and collimating the same using a collimating element;
dispersing the collimated light using a dispersive optical element; and
receiving the dispersed light from the dispersive optical element and focusing the same on a detector assembly using a focusing element;
wherein the collimating element, the dispersive optical element and the focusing element are housed in a first chamber which is filled with ambient air;
wherein the detector assembly is housed in a second chamber; and
wherein the detector assembly comprises at least one detector hermetically sealed within the second chamber, and further wherein the second chamber is filled with a noble gas.

35. A method according to claim 34 wherein, where the wavelength dispersion of the dispersed light extends in the x-y direction, the collimating element and the focusing element are formed so as to maintain the desired optical parameters in the x-y plane while having a reduced size in the z direction.

36. A spectrometer comprising:
a base;
a collimating element for receiving input light and collimating the same;
a dispersive optical element for receiving light from the collimating element and dispersing the same; and
a focusing element for receiving light from the dispersive optical element and focusing the same on a detector assembly;
wherein the collimating element, the dispersive optical element and the focusing element are all formed separately from one another and are all independently mounted to the base so as to be separately adjustable in relation to one another and in relation to the base;
wherein, where the wavelength dispersion of the dispersed light extends in the x-y direction, the collimating element and the focusing element are formed so as to maintain the desired optical parameters in the x-y plane while having a reduced size in the z direction;
wherein the dispersive optical element is a diffraction grating;
wherein the dispersive optical element comprises a transmission diffraction grating.

37. A spectrometer comprising:
a base;
a collimating element for receiving input light and collimating the same;
a dispersive optical element for receiving light from the collimating element and dispersing the same; and
a focusing element for receiving light from the dispersive optical element and focusing the same on a detector assembly;
wherein the collimating element, the dispersive optical element and the focusing element are all formed separately from one another and are all independently mounted to the base so as to be separately adjustable in relation to one another and in relation to the base;
wherein, where the wavelength dispersion of the dispersed light extends in the x-y direction, the collimating element and the focusing element are formed so as to maintain the desired optical parameters in the x-y plane while having a reduced size in the z direction;
wherein the dispersive optical element comprises a thin film element.

38. A spectrometer comprising:
a base;
a collimating element for receiving input light and collimating the same;
a dispersive optical element for receiving light from the collimating element and dispersing the same; and
a focusing element for receiving light from the dispersive optical element and focusing the same on a detector assembly;
wherein the collimating element, the dispersive optical element and the focusing element are all formed separately from one another and are all independently mounted to the base so as to be separately adjustable in relation to one another and in relation to the base;
wherein, where the wavelength dispersion of the dispersed light extends in the x-y direction, the collimating element and the focusing element are formed so as to maintain the desired optical parameters in the x-y plane while having a reduced size in the z direction;
wherein the detector assembly comprises a single detector located beyond an output slit, and further wherein the dispersive optical element is adapted to rotate.

* * * * *